Patented Oct. 11, 1932

1,882,476

UNITED STATES PATENT OFFICE

HARRY M. BLINN, OF BALTIMORE, MARYLAND, ASSIGNOR TO DOUGHNUT MACHINE CORPORATION, OF NEW YORK, N. Y., A CORPORATION OF NEW YORK

DRY COATING FOR ALIMENTARY PRODUCTS

No Drawing.   Application filed July 26, 1930. Serial No. 471,092.

This invention relates to dry coatings for alimentary products as well as to methods of producing such coatings.

Ordinarily sugar, particularly when in comminuted form, i. e., either powdered or granulated, is highly hygroscopic, and moreover, is readily attacked by oil or fat with attendant discoloration or staining thereof. Thus, when comminuted sugar is used as a dusting for alimentary products, the moisture expelled incident to drying out or cooling of such products, is greedily absorbed by the sugar which therefore becomes slimy and wet. Then again, in the case of alimentary products containing or covered with a considerable amount of oil or fat such for example as cookies, and doughnuts, crullers or other cakes which have been fried in grease, the penetration of the sugar coating by the grease oozing from the interior of the cakes and by that on the surface, as well as the absorption of expelled moisture from the interior, creates a soggy and unappetizing appearance of the cakes which greatly detracts from their saleability.

My invention is directed toward overcoming the above recited drawbacks; and this desideratum I attain by pre-treating the sugar to render it immune against subsequent attack by oil or fat and at the same time against absorption of moisture when used as a dry coating agent.

In carrying out my invention, I uniformly heat a quantity of comminuted sugar to a temperature of approximately 130 degrees Fahrenheit. While maintaining the sugar at this temperature, I add a small percentage by weight of a fat or oil having a relatively high melting point, the quantity being just sufficient to ultimately provide a thin film over the sugar particles. I then agitate the mass thoroughly over an adequate period of time to assure even assimilation and distribution of the fat or oil as it is fused or melted under the action of the heat. Finally, while still continuing the agitation of the mixture as just explained, I suddenly chill the mass to congeal the fat or oil.

Virtually every fat or oil ordinarily used in cooking consists of two or more fatty glycerides each of which has its own characteristics and particular melting point. Slow cooling of such fats or oils is attended by a separation of the component glycerides to the end that the fats or oils retain their oily characteristic to some extent; but sudden chilling leaves the fats or oils in a homogeneous hardened condition. Therefore, by abruptly cooling the heated mixture as above explained, the fat or oil is converted into a hardened film around the individual discrete, separate particles of the sugar. The film thus formed has the ability to effectively resist subsequent re-melting at moderate to warm atmospheric temperatures and will therefore stay solid under summer heat up to and above 90 degrees Fahrenheit. The film moreover renders the sugar immune against subsequent attack by fat as well as against absorption of moisture when it is applied to alimentary products such as doughnuts, crullers and the like Although other kinds of cooking oils and fats may be used, highly satisfactory results are secured with 2 to 5% by weight of hydrogenated cocoanut oil, which has a melting point upwards of 110 degrees Fahrenheit and which is transformed almost immediately from the solid to the liquid state at the critical temperature of fusion. A further advantage resulting from use of hydrogenated cocoanut oil is that it is substantially white and therefore does not discolor or stain the sugar.

It is to be understood that my process is not confined alone to the treatment of cane sugar since corresponding results are obtained with corn and other sugars, as well as with admixtures of sugars and starches or other floury materials. In any case, the particles of the processed material do not adhere to each other, and the coating can therefore be handled just like ordinary comminuted sugar in coating bakery and other alimentary products of various kinds.

Having thus described my invention, I claim:

1. Dusting sugar for doughnuts and the like, consisting of discrete, separate sugar particles individually coated with solid fat, and thus rendered non-absorbent of moisture and oil from the articles dusted with the particles.

2. Dusting sugar for doughnuts and the like, consisting of discrete, separate sugar particles individually coated with solid substantially homogeneous hydrogenated cocoanut oil, and thus rendered non-absorbent of moisture and oil from the articles dusted with the particles.

3. A process of treating dusting sugar to render it non-absorbent of moisture and oil from the articles dusted therewith, which process comprises agitating the discrete, separate sugar particles with a small percentage of molten fat at a temperature sufficient to keep the fat freely fluid, but not to fuse the sugar, and suddenly chilling them while continuing the agitation, thus coating the individual sugar particles with the solid fat while yet leaving them separate and discrete.

4. A process of treating dusting sugar to render it non-absorbent of moisture and oil from the articles dusted therewith, which process comprises agitating the discrete, separate sugar particles with a small percentage of hydrogenated cocoanut oil at a temperature sufficient to keep the fat freely fluid, but not to fuse the sugar, and suddenly chilling them while continuing the agitation, thus coating the individual sugar particles with the solid fat while yet leaving them separate and discrete.

In testimony whereof, I have hereunto signed my name at Ellicott City, Maryland, this 22nd day of July, 1930.

HARRY M. BLINN.